Sept. 3, 1957     C. J. LUMB, JR     2,805,313
AQUARIUM HEATING
Filed May 4, 1956
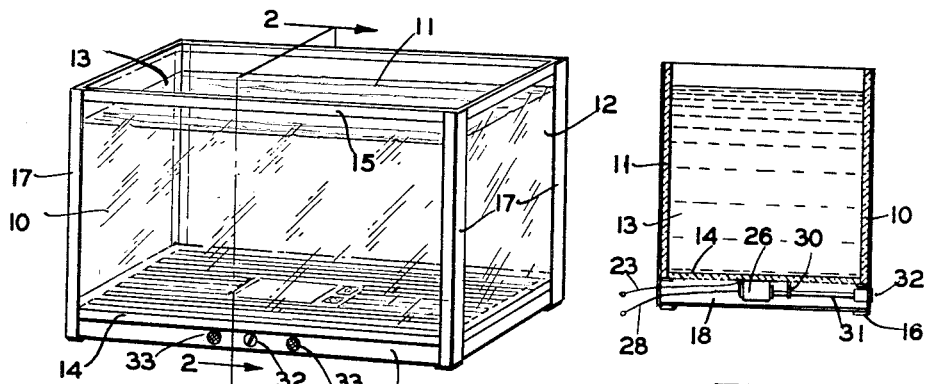
FIG. 1
FIG. 2
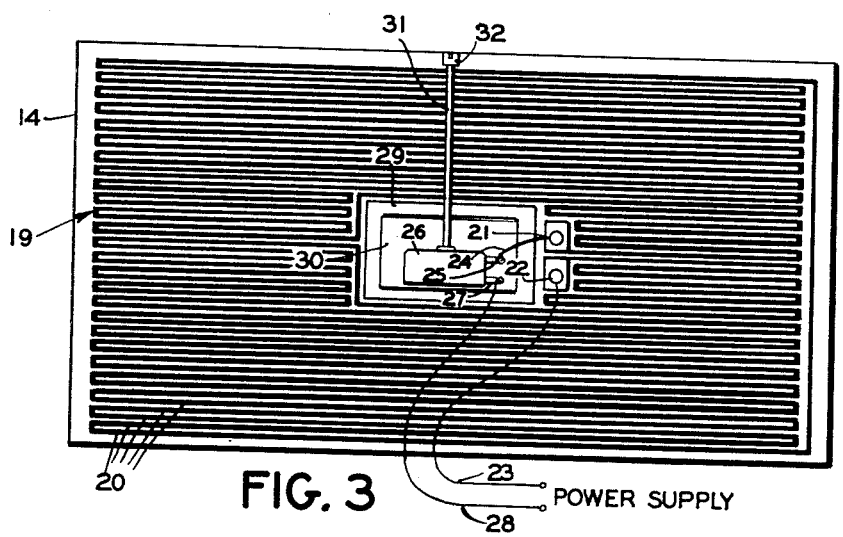
FIG. 3
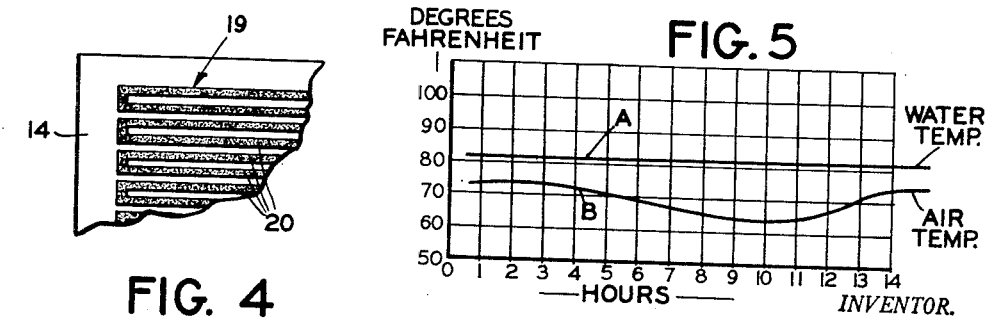
FIG. 4
FIG. 5
INVENTOR.
CHARLES J. LUMB JR.

United States Patent Office

2,805,313
Patented Sept. 3, 1957

2,805,313

AQUARIUM HEATING

Charles J. Lumb, Jr., New Milford, N. J.

Application May 4, 1956, Serial No. 582,837

3 Claims. (Cl. 219—38)

This invention relates generally to aquariums, and more particularly to aquariums wherein the temperature of the water may be maintained substantially constant notwithstanding variations in the temperature of the surrounding air.

It has been the practice heretofore with known arrangements of this nature to either immerse self-contained heating elements into the water in the aquarium, or to attach such heating elements to the base of the aquarium to thereby maintain the water temperature at some predetermined relation with respect to the temperature of the surrounding air. The difficulty with such known arrangements, however, has been that only localized portions of the aquarium, i. e., the portions immediately surrounding the heating element or elements, were heated, while other portions thereof remained without the full benefit of such heating. One of the obvious disadvantages encountered was the undesirable time lag in bringing certain portions of the aquarium to the desired temperature at the expense of overheating other portions thereof.

An object of the present invention, therefore, is to provide a novel aquarium, or the like, wherein the temperature of the water or other fluid is maintained substantially constant in spite of variations in the ambient temperature.

Another object of the present invention is to provide a novel, simple and relatively inexpensive heated aquarium.

A further object is to provide a novel aquarium having a continuous grid-like heating element on one wall thereof, such as the bottom wall for example, for maintaining the temperature of the aquarium at a predetermined relation to the ambient temperature.

A still further object is to provide a novel container whose contents may be maintained automatically at a desired and uniform temperature throughout, notwithstanding variations in ambient temperature.

A further object is to provide a novel aquarium whose contents may be maintained automatically at a desired and uniform temperature and whose interior may be clearly viewed without the obstruction of immersion type heater or heaters.

The above and further objects and novel features of the invention will more fully appear from the following detailed description when the same is read in connection with the accompanying drawing. It is to be expressly understood, however, that the drawing is for the purpose of illustration only, and is not intended as a definition of the limits of the invention.

In the drawing wherein like reference characters refer to like parts throughout the several views:

Figure 1 is a perspective view of the novel aquarium of the present invention;

Figure 2 is a view in section taken substantially along line 2—2 of Figure 1;

Figure 3 is an enlarged view of the bottom wall of the aquarium of Figure 1 embodying the novel heating means hereof;

Figure 4 is an enlarged fragmentary section of the structure of Figure 3; and

Figure 5 is a graph of water and ambient temperature curves illustrating the operational characteristics of the present invention.

The novel aquarium of the present invention is shown in Figure 1 of the drawing, for illustrative purposes only, as comprising a generally rectangular tank having side walls or panels 10 and 11, end walls or panels 12 and 13, and a bottom wall or panel 14. The various walls or panels are properly joined at their adjacent surfaces to form a sealed container and may be formed of suitable transparent material such as glass, plastic, etc., to thereby form an enclosure whose contents may be readily viewed from the outside thereof by an observer.

The tank or container is provided with top and bottom reinforcing or ornamental strips 15 and 16 as well as end strips 17, with strip 16 extending below bottom wall or panel 14 so as to define not only a rigid support for the container but, with the bottom wall or panel 14, a central chamber 18 better shown in Figure 2 for a purpose to presently appear.

To heat the contents of the tank or container in accordance with the present invention, bottom wall or panel 14 supports an electrical grid 19 thereover which is heated when subjected to electrical current flow therethrough, and by radiation uniformly heats the tank contents. One form that wall or panel 14 may take is that which is known in the trade as "Electriglas." In such case, wall 14 will constitute a tempered glass panel, to one side of which is fused, a chemical ceramic element defining electrical grid 19. A second layer of glass is fused to that side of panel 14 having grid 19 thereon, thereby permanently protecting the latter against oxidation and deterioration.

As better shown in Figure 4 of the drawing, grid 19 comprises a continuous heating element, covering substantially the entire area of panel 14, and is arranged in a series of interconnected spaced parallel strips 20, with one end of the strip connected to a terminal 21 and the opposite end of the strip connected to a terminal 22 (Figure 3). Terminals 21 and 22 extend from panel 14 so that terminal 22 connects by way of a lead 23 to one side of a suitable source of current which may constitute a simple electrical outlet in a building, while terminal 21 connects by way of lead 24 with one terminal 25 of a conventional settable thermostat 26 arranged within chamber 18. The opposite terminal 27 of the thermostat connects by way of a lead 28 with the opposite side of the electrical outlet.

While strips 20 of grid 19 cover substantially the entire area of panel 14, they are so arranged as to define a clear area 29 which may be directly engaged by thermostat 26 or indirectly through a heat conducting bracket 30 suitably fastened to panel 14 within chamber 18. The benefit of the clear area will be obvious since the thermostat will sense more accurately water temperature changes. The bracket supports an angularly displaceable rod 31 connected at one end to the thermostat and extending at its other end through bottom srip 16 where it accommodates a manually operable knob 32 by virtue of which the thermostat may be adjusted for a desired temperature to control current flow through grid 19. In addition to rod 31, bottom strip 16 may also accommodate two warning lamps 33 indicating passage of current through grid 19.

It will now be readily apparent to those skilled in the art that if the tank is to accommodate tropical fish, for example, it may be desired to maintain the water temperature in the tank at substantially eighty-two (82°) degrees. Thermostat 26 is adjusted by way of manually settable knob 32 so that as soon as the temperature of the water becomes less than that desired, the circuit is closed by the thermosat in a conventional manner and current flows through grid 19 thereby heating the latter. Heat radiation by panel 14 raises the water temperature whereupon the increased temperature is communicated to the thermostat to open the circuit when the desired water temperature has been achieved.

Actual test conducted with the novel aquarium of the present invention, demonstrated that over a fourteen (14) hour period the temperature of the water was maintained substantially constant in spite of substantial change (overnight) of ambient temperature. The actual recorded results are demonstrated graphically in Figure 5 where curve A represents the water temperature of the tank and curve B the ambient temperature.

Although only one embodiment of the invention has been illustrated and described in detail, it is to be expressly understood that the invention is not limited thereto. Various changes may be made in the design and arrangement of the parts without departing from the spirit and scope of the invention, as the same will now be understood by those skilled in the art. For a definition of the limits of the invention, reference will be had primarily to the appended claims.

What is claimed is:

1. An aquarium for accommodating aquatic life therein comprising a fluid container having sealably interconnected end, side and bottom walls, a primary heating source supported by an outer portion of one of said walls substantially the entire area thereof for heating the fluid within the container, and means responsive to temperature change of the fluid within the container connected for controlling said heating source to maintain the fluid temperature substantially constant.

2. An aquarium for accommodating aquatic life therein comprising a fluid container having a heat conducting wall, means comprising a series of interconnected spaced parallel heating grids arranged substantially the entire area of the wall on an outside portion thereof for heating the fluid within the container, said heating grids being arranged to provide a clear space on said wall, and means responsive to temperature change of the fluid within the container mounted on the wall adjacent the clear space thereon and operatively connected to said heating grids.

3. An aquarium for accommodating aquatic life therein comprising a fluid container having a bottom heat conducting wall, a primary heating source supported by an outer portion of said wall along substantially the entire area thereof for heating the fluid within the container, and means mounted on said wall responsive to temperature change of the fluid within the container connected for controlling said heating source, to thereby maintain the fluid temperature substantially constant.

References Cited in the file of this patent
UNITED STATES PATENTS

| | | |
|---|---|---|
| 1,777,862 | Schwedler | Oct. 7, 1930 |
| 2,513,993 | Burton | July 4, 1950 |
| 2,563,874 | Salton | Aug. 14, 1951 |
| 2,623,971 | Glynn | Dec. 30, 1952 |
| 2,715,174 | Nathanson | Aug. 9, 1955 |